(12) United States Patent
Amador et al.

(10) Patent No.: US 7,487,721 B2
(45) Date of Patent: Feb. 10, 2009

(54) ORIFICE TUBE WITH ENHANCED ANGLE AND ASSOCIATED METHODS

(76) Inventors: João Roberto Amador, 2442 Colonel Ford Dr., Lakeland, FL (US) 33813; Hélio Brandão, Jr., 1095 Clearpointe Way, Lakeland, FL (US) 33813; André Vicente Ricco Lucato, Rua Renato Opice, #66, Araraquara, São Paulo (BR) 14802-289

( * ) Notice: Subject to any disclaimer, the term of this patent is extended or adjusted under 35 U.S.C. 154(b) by 879 days.

(21) Appl. No.: 10/635,226

(22) Filed: Aug. 6, 2003

(65) Prior Publication Data
US 2005/0028684 A1 Feb. 10, 2005

(51) Int. Cl.
B30B 9/02 (2006.01)
A23N 1/02 (2006.01)
(52) U.S. Cl. ............ 100/213; 100/108; 100/127; 99/509; 99/495; 29/890.053
(58) Field of Classification Search .......... 100/37, 100/98 R, 104, 108, 110, 126, 127, 213; 99/495, 99/509, 510, 513; 29/523, 890.053; 72/367.1, 72/370.1
See application file for complete search history.

(56) References Cited

U.S. PATENT DOCUMENTS

| | | | |
|---|---|---|---|
| 2,649,730 A | 8/1953 | Hait | |
| 2,846,943 A | 8/1958 | Belk | 100/108 |
| 2,856,846 A | 10/1958 | Belk | 100/108 |
| 3,236,175 A | 2/1966 | Belk | |
| 4,700,620 A * | 10/1987 | Cross | 99/510 |
| 4,951,563 A | 8/1990 | Warren et al. | 100/111 |
| 5,339,729 A * | 8/1994 | Anderson | 99/509 |
| 6,568,319 B2 | 5/2003 | Schrader et al. | 100/108 |
| 2002/0166465 A1 | 11/2002 | Schrader et al. | 100/98 |

* cited by examiner

Primary Examiner—Jimmy T Nguyen
(74) Attorney, Agent, or Firm—Allen, Dyer, Doppelt, Milbrath & Gilchrist, P.A.

(57) ABSTRACT

A juice extractor includes first and second opposing cups relatively movable to compress a fruit therebetween, a strainer tube associated with the first cup, and an orifice tube being movable within the strainer tube and having a pressure-applying end surface for urging juice through the strainer tube. The pressure-applying end surface may have a first surface portion with an angle greater than about 130°, and more preferably about 145° to 160°, such as about 150°, for example. The orifice tube may carry a restrictor tube within an internal bore of the orifice tube in some embodiments. The restrictor tube may have a pressure-applying end surface with a similar angle.

25 Claims, 3 Drawing Sheets

US 7,487,721 B2
1

ORIFICE TUBE WITH ENHANCED ANGLE AND ASSOCIATED METHODS

FIELD OF THE INVENTION

This invention relates to the field of juice extractors, and more particularly, to a juice extractor and orifice tube and/or restrictor tube for a juice extractor to have increased juice extraction efficiency and related methods.

BACKGROUND OF THE INVENTION

A known FMC Technologies juice extractor is disclosed in U.S. Pat. No. 2,649,730 to Hait, and assigned to the present assignee, the disclosure which is hereby incorporated by reference in its entirety. In this vertically arranged juice extractor, upper and lower cups support a fruit, vegetable or similar product. The sides of both upper and lower cups have fingers that interdigitate together. The upper cup descends into the lower cup against the fruit or vegetable and is pressed against a circular, lower cutter positioned at the top of a strainer tube adjacent the lower cup and an upper cutter positioned in the upper cup. Plugs are cut into the top and bottom portions of the fruit as the interdigitating fingers of the two cups mesh together. Inner portions of the fruit, such as the pulp and juice, are forced down into the strainer tube positioned within a manifold.

An orifice tube moves upward into the strainer tube and applies pressure within the internal portion of the strainer tube to separate juice and pulp within the strainer tube. Juice and juice sacks flow through holes of the strainer tube and into a juice manifold. Those internal portions of the fruit having particle sizes larger than the holes in the strainer tube are forced through a discharge opening in the orifice tube and then discharged.

Window-type orifice tubes, such as disclosed in U.S. Pat. No. 3,236,175 and published U.S. patent application Ser. No. 2002-0166465-A1, the disclosures which are hereby incorporated by reference in their entirety, use "windows" formed in the orifice tube to engage the fruit or vegetable and enhance juice recovery. In the published '465 patent application, a two-piece orifice tube has a screw-in, hardened window portion. The orifice tube described in the '175 patent is stainless steel with an outer plastic sleeve. Some commercial improvements to an orifice tube coat the external surface of the tube with a stellite alloy and machine the tube after coating it to increase wear resistance on the external surface.

In the past, FMC Technologies has made a solid orifice tube, meaning no restrictor inserted therein, having three surface portions on its end face. A radially innermost beveled surface portion had a bevel angle of 60°, an intermediate beveled surface portion had a bevel angle of 120°, and an outermost surface portion was flat. The radially innermost and intermediate surface portions together defined the pressure-applying end surface of the orifice tube. The radially outermost flat surface portion provided a ring-support surface for the orifice tube, for supporting an adjacent split ring of the extractor. The innermost beveled surface and outermost surface each comprised about 10% of the wall thickness of the tube, while the intermediate beveled surface comprised the remaining 80%.

In other configurations of the FMC Technologies juice extractor, a restrictor tube is used in the bore of the orifice tube. The restrictor permits adjustment for different fruit that may be available at different times of the year. In other words, different sized restrictor tubes can be changed out and used at different times of the year, for example. The orifice tube included three surface portions as described above, but with slightly different proportions. More particularly, the radially innermost beveled surface portion was about 25%, the intermediate beveled surface portion about 50%, and the outermost flat ring-support surface portion about 25% of the total wall thickness. The wall thickness of the orifice tube for use with a restrictor was also typically less than for the solid orifice tube embodiments.

The restrictor tube had an innermost beveled surface portion of 60°, and an outermost beveled surface portion of 120°. The innermost beveled surface extended over about 40% of the wall thickness of the restrictor tube, and the outermost beveled surface extended over the remaining 60%. There was no flat ring-support surface portion on the end of the restrictor tube.

The yield of juice from the fruit is an important component of processing efficiency, and, hence, commercial success. There is a continuing need to improve juice yield and while still maintaining high quality of the juice.

SUMMARY OF THE INVENTION

It is therefore an object of the present invention to provide an extractor and associated orifice tube and/or orifice tube and restrictor tube to provide increased yield.

This and other objects, features and advantages in accordance with the present invention are provided by a juice extractor comprising first and second opposing cups relatively movable to compress a fruit therebetween, a strainer tube associated with the first cup, and an orifice tube being movable within the strainer tube and having a pressure-applying end surface for urging juice through the strainer tube. The extractor may further comprise a drive mechanism for reciprocating the orifice tube within the strainer tube. More particularly, the pressure-applying end surface of the orifice tube may have at least a first surface portion with an angle greater than about 130°. More preferably, the angle of the first surface portion may be in a range of about 145° to 160°, such as about 150°, for example. This increased angle, as compared to the prior art, has been found to produce greater juice yield for citrus fruit, such as oranges, while maintaining high quality in the juice.

The first surface portion may extend over greater than about 50% of a total wall thickness of the orifice tube. The first surface portion may extend over a total extent of the pressure-applying end surface of the orifice tube in some embodiments.

In other embodiments, the first surface portion may be radially innermost and adjacent the internal bore of the orifice tube, and the pressure-applying end surface of the orifice tube may further have a second surface portion surrounding the first surface portion. The second surface portion may have an angle less than the angle of the first surface portion. In addition, the orifice tube may further have an outermost flat ring-support surface portion that is not part of the pressure-applying end surface, but that surrounds the second surface portion.

The orifice tube may carry a restrictor tube within an internal bore of the orifice tube in some embodiments. Accordingly, the restrictor tube may comprise a pressure-applying end having a third surface portion with an angle greater than about 130°, and more preferably, in a range of about 145° to 160°, such as about 150°. This third surface portion may extend over greater than about 50% of a total wall thickness of the pressure-applying end of the restrictor tube, or in other embodiments, may extend over the entire thickness.

The third surface portion may be radially outermost and adjacent the internal bore of the orifice tube. The pressure-applying end of the restrictor tube may further have a fourth surface portion surrounded by the third surface portion with an angle less that the angle of the third surface portion.

Another aspect of the invention relates to the orifice tube for a juice extractor. The orifice tube may comprise a tubular body being movable within the strainer tube and including a pressure-applying end surface for urging juice through the strainer tube. The pressure-applying end surface may have at least a first surface portion with an angle greater than about 130°. The invention is also directed to a method for making such an orifice tube.

Yet another aspect of the invention relates to the restrictor tube for an orifice tube for a juice extractor. The restrictor tube may comprise a tubular body being positionable within the internal bore of the orifice tube and including a pressure-applying end surface for urging juice through the strainer tube, and wherein the pressure-applying end surface has at least a third surface portion with an angle greater than about 130°. The invention is also directed to a method for making such a restrictor tube.

BRIEF DESCRIPTION OF THE DRAWINGS

Other objects, features and advantages of the present invention will become apparent from the detailed description of the invention that follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternate embodiments.

Figure 1:
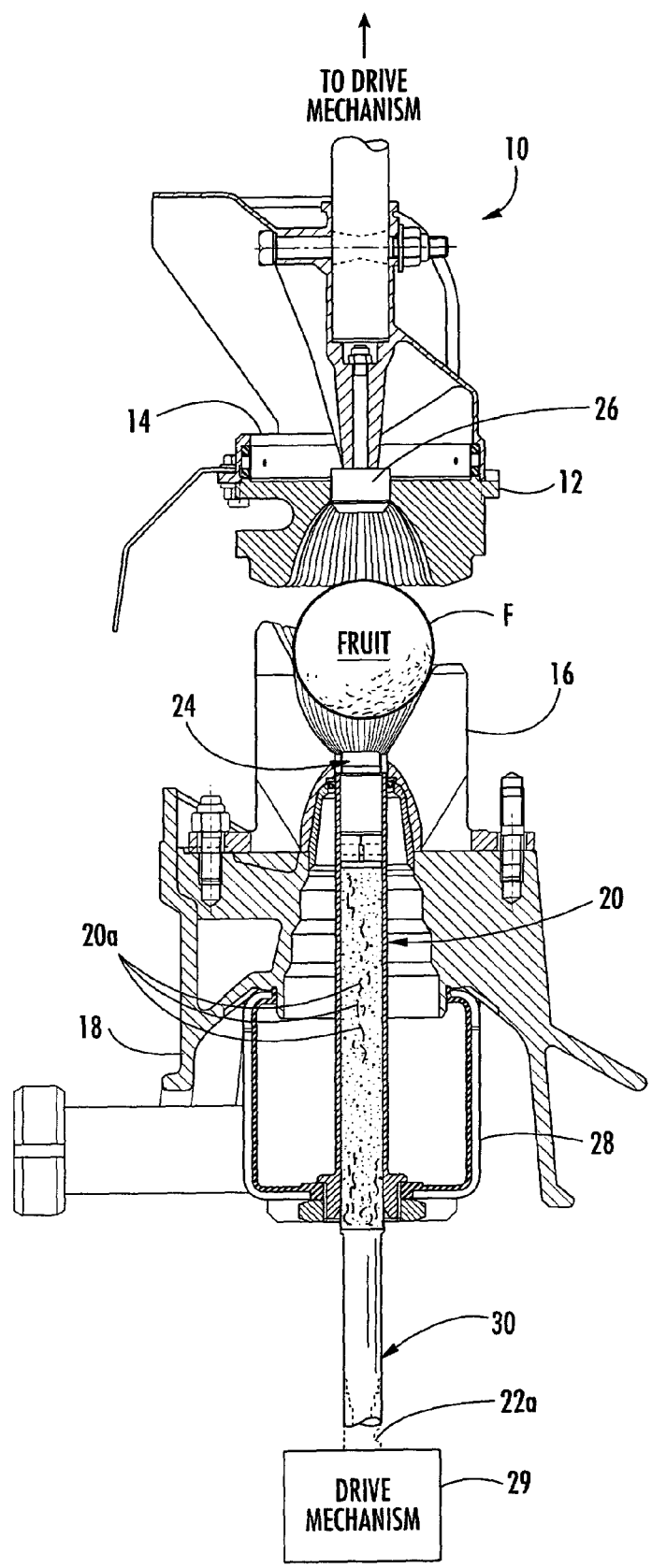
FIG. 1 is a schematic fragmentary view of a portion of a juice extractor according to the invention.
Figure 2:
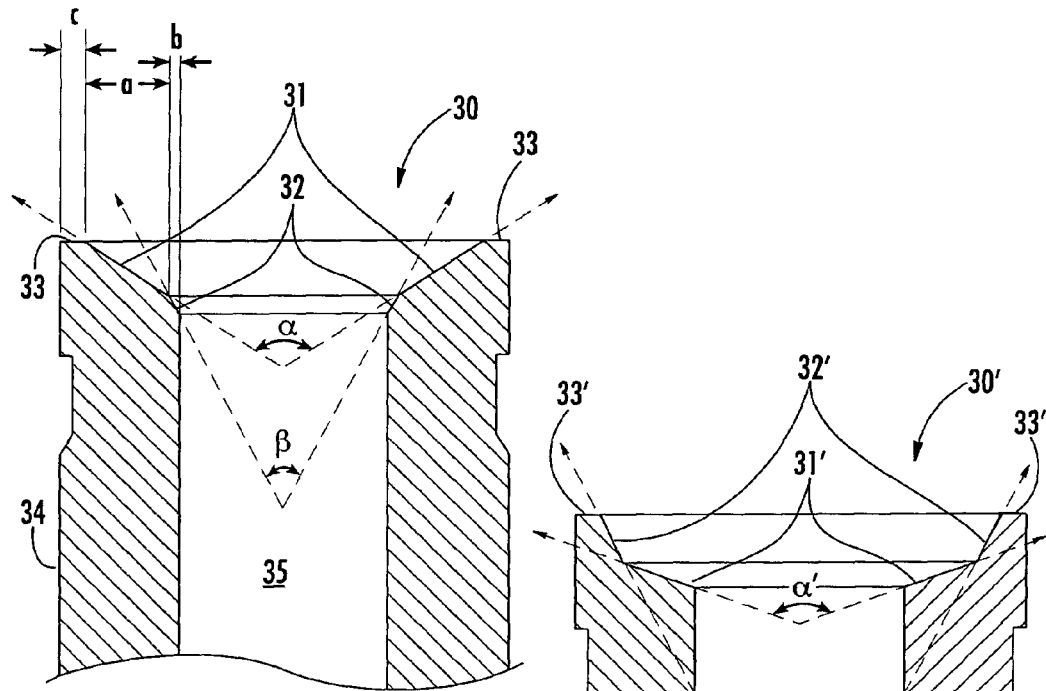
FIG. 2 is an enlarged cross-sectional view of an upper portion of the orifice tube used in the extractor of FIG. 1.

Referring initially to FIGS. 1 and 2, an extractor 10 and a first embodiment of an orifice tube 30 for the extractor are now described. Although a vertical juice extractor 10 is illustrated, it should be understood that different types of juice extractors can be used with the present invention, including those having horizontally moving cups and other similar mechanisms.

The basic juice extractor 10 includes an upper cup 12 mounted on a common crossbar 14, which could interconnect other cups of other juice extractor units (not shown), as known to those skilled in the art. Naturally, the juice extractor 10 could be used as a single juice extractor unit or ganged with a plurality of juice extractors. The crossbar 14 moves in a fixed up and down direction by a drive system (not shown) mounted in the top portion of the juice extractor 10. The lower cup 16 is rigidly positioned to a frame 18. The upper and lower cups 12, 16 are formed as interdigitated cups having fingers that intermesh together when the upper cup 12 is moved into the lower cup 16.

The upper and lower cups 12, 16, the prefinisher strainer tube 20, the orifice tube 30 and associated components may be considered as forming one juice extractor unit. The drive mechanism 29 drives the upper cup 12 into the lower cup 16, and as this occurs, any fruit F or vegetable is pressed against a circular lower cutter 24 formed as a tube and located at the top of the strainer tube 20. This cutter 24 cuts a plug in the bottom of the fruit F to allow internal portions of the fruit access to the strainer tube 20. A circular upper cutter 26 cuts a plug in the top of the fruit to permit separation of peel from internal portions of the fruit, such as the pulp.

As the fingers of the upper and lower cups 12, 16 interdigitate or mesh together, the inner portions of the fruit, such as any pulpy juice, are forced down into the strainer tube 20 contained within a juice manifold 28. In the early phase of the extraction cycle, the upper cup 12 moves downward to cause pressure on the fruit F such that top and bottom plugs are cut. Because of the profile of the interdigitating cups, the fruit F or other supported body, such as a vegetable, is totally supported, and will not burst, but obtain an even squeeze.

As the extraction cycle continues, pressure increases on the fruit F, causing some internal portions to form a bottom plug and move into the strainer tube 20. When there is a peel clearance, the peel is discharged between the upper cup 12 and cutter 26. Upon completion of the extraction cycle, internal portions of the fruit are positioned in the strainer tube 20. At this time, the orifice tube 30 is moved upward by the drive mechanism 29, placing pressure on the contents of the strainer tube. The juice and juice sacks, because of their small particle size, flow through the holes 20a of the strainer tube and into the juice manifold 28. Those internal portions of the fruit having particle sizes larger than the holes 20a in the strainer tube 20 are forced through a discharge opening at a lower end 22a of the orifice tube 30 and are discharged. The peel falls away outside the juice manifold 28 and can be collected by a peel screw conveyor under an extractor platform or other means (not shown) and discharged into a hopper or other waste disposal container and conveyed by truck or trailer to a desired destination for further processing, if desired.

Referring now more particularly to the enlarged cross-sectional view of FIG. 2, the orifice tube 30 includes a tubular body 34, that, in turn, includes a pressure-applying end surface having a first surface portion 31 with an angle $\alpha$ greater than about 130°. More particularly, the angle $\alpha$ is the included angle of a first imaginary cone. The angle $\alpha$ can even be flat, that is, 180° in some embodiments. More preferably, the angle $\alpha$ may be in a range of about 145° to 160°, such as about 150°, for example. This increased angle, as compared to the prior art, has been found to produce greater juice yield for citrus fruit, such as oranges, as will be discussed in greater detail below.

The first surface may extend over a distance a that is greater than about 50% of a total wall thickness (a+b+c) of the orifice tube. In this embodiment, a second surface portion 32 is provided as a radially innermost surface portion adjacent the internal bore 35 of the orifice tube 30. This second surface portion 32 has an angle β that is less than the angle α of the first surface portion 31. The angle β is the included angle of a second imaginary cone. This second surface portion illustratively extends over a distance b that is a fraction of the total wall thickness. For example, the angle β may be about 60°, and the length b may be about 10% of the total wall thickness.

The orifice tube 30 also includes a flat ring-support surface portion 33 that is radially outermost and that may extend for a distance c that is about 20% of the total wall thickness. This flat ring-support surface portion 33 does not contact the fruit contents and is not part of the pressure-applying end surface, but instead supports a split ring, not shown. In other words, the first and second surface portions 31, 32 define the pressure-applying end surface of the orifice tube 30 as will be appreciated by those skilled in the art.

Figure 3:
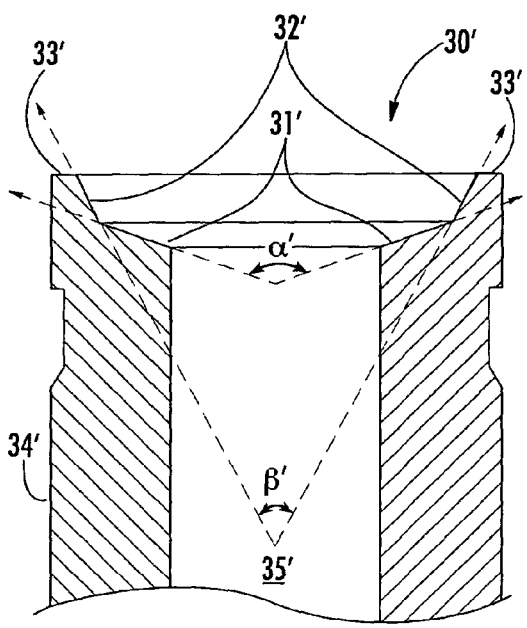
FIG. 3 is an enlarged cross-sectional view of an upper portion of another embodiment of an orifice tube for use in the extractor of FIG. 1.

Turning now additionally to FIG. 3, another embodiment of the orifice tube 30' is now described. In this embodiment, the first surface portion 31' is illustratively radially innermost and adjacent the internal bore 35' of the tubular body 34' of the orifice tube 30'. The pressure-applying end of the orifice tube 30' also has a second surface portion 32' surrounding the first surface portion 31'. The second surface portion 32' may have an angle β' less than the angle α'. Both angles α' and β' may be in the respective ranges as described above, and with the same result of increased juice yield. A flat outermost ring-support surface portion 33' is also provided in this embodiment of the orifice tube 30'. The first surface portion 31' may extend over about 70% of the total wall thickness, the second surface portion 32' may extend over about 20%. The outer ring-support surface portion 33' may extend over about 10% of the wall thickness.

Figure 4:
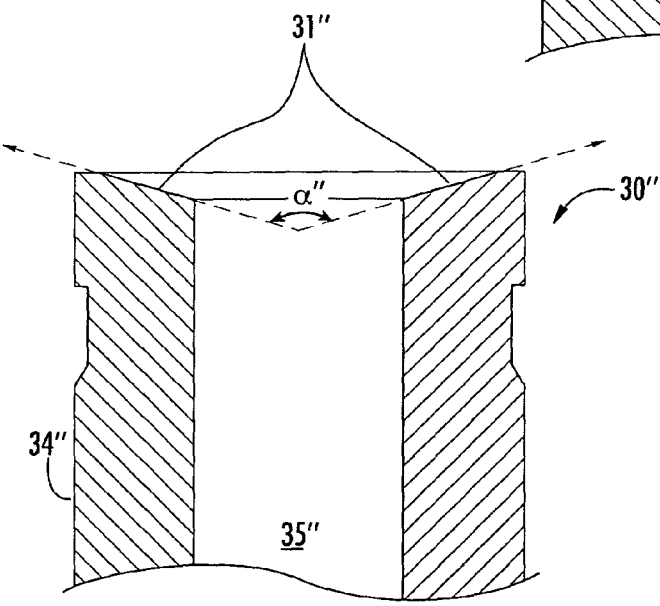
FIG. 4 is an enlarged cross-sectional view of an upper portion of still another embodiment of an orifice tube to be used in the extractor of FIG. 1.

Turning now additionally to FIG. 4, yet another embodiment of the orifice tube 30" is now described. In this embodiment, the first surface portion 31" extends across the entire wall thickness at the angle α". This configuration will also yield the juice yield improvement over the prior art.

Figure 5:
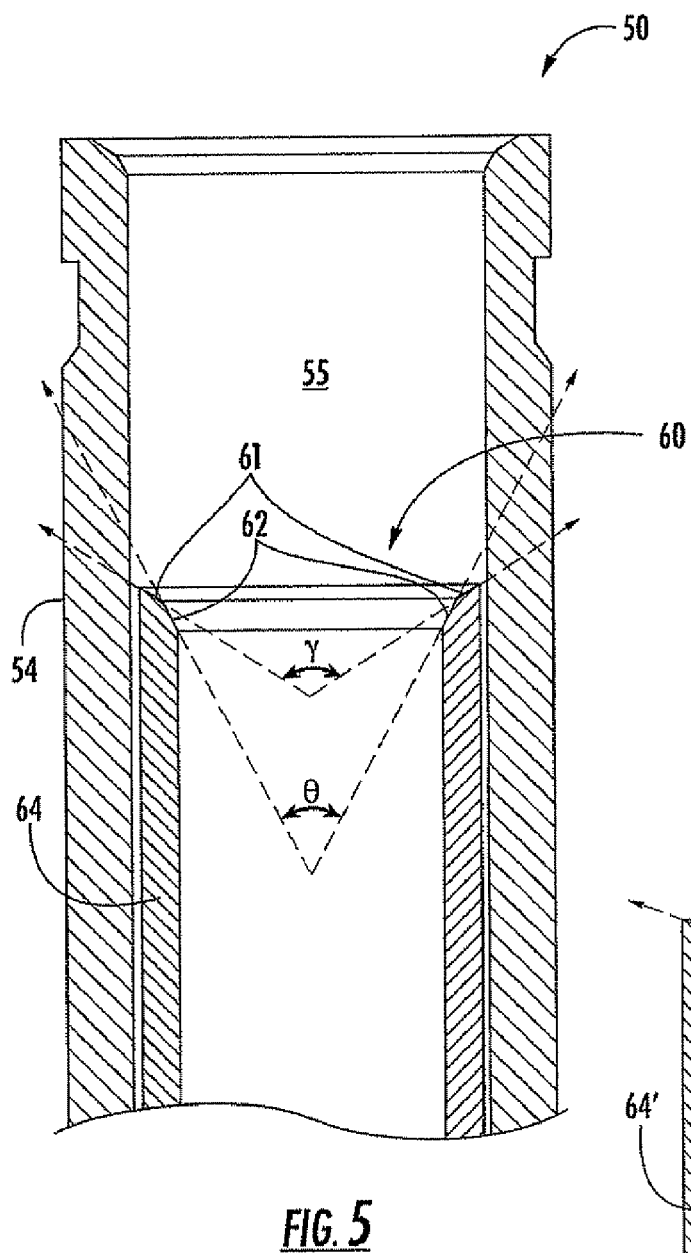
FIG. 5 is an enlarged cross-sectional view of an upper portion of another embodiment of an orifice tube and restrictor tube to be used in the extractor of FIG. 1.

As now explained with reference to FIG. 5, the orifice tube 50 may carry a restrictor tube 60 within the internal bore 55 of the orifice tube in some embodiments. In these embodiments, the tubular body 54 of the orifice tube 50 has a wall thickness of about half the thickness of the embodiments discussed above that are solid or devoid of a restrictor tube. Accordingly, the end of the orifice tube 50 has a reduced effect compared to the restrictor tube 60 as will be appreciated by those skilled in the art. The end of the orifice tube 50 may have any of the configurations described above for increasing juice yield, but may also have a conventional shape wherein the restrictor tube 60 provides the increased juice yield.

The restrictor tube 60 illustratively includes a tubular body 64, that, in turn, includes a pressure-applying end surface having a third surface portion 61 with an angle γ greater than about 130°, and more preferably, in a range of about 145° to 160°, such as about 150°. The angle γ is the included angle of a third imaginary cone. This third surface portion 61 may extend over greater than about 50% of a total wall thickness of the restrictor tube 60, for example. This third surface portion 61 and the angle thereof also serve to provide increased juice yield in accordance with the invention.

The third surface portion 61 is illustratively a radially outermost surface portion and is adjacent the internal bore 55 of the orifice tube 50. The pressure-applying end surface of the restrictor tube 60 may further have a fourth surface portion 62 surrounded by the third surface portion 61 with an angle θ less than the angle γ. The angle θ is the included angle of a fourth imaginary cone. For example, the angle θ may be about 60°, although other angles are also possible as will be appreciated by those skilled in the art.

Figure 6:
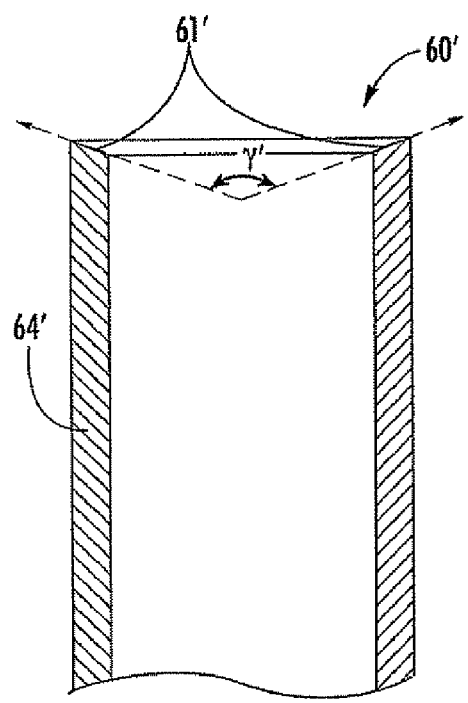
FIG. 6 is an enlarged cross-sectional view of an upper portion of another embodiment of a restrictor tube to be used with the orifice tube as shown in FIG. 5.

Referring now additionally to FIG. 6, another embodiment of a restrictor tube 60' is now described. In this embodiment, the restrictor tube 60' has a third surface portion 61' with an angle γ' that extends across the entire wall thickness. The angle γ' may also be greater than about 130°, and more preferably, in a range of about 145° to 160°, such as about 150°.

The invention is also directed to a method of making an orifice tube as described above. The method may include forming a tubular body to be movable within the strainer tube and having a pressure-applying end surface for urging juice through the strainer tube. The method may also include and forming the pressure-applying end surface to have at least a first surface portion with an angle greater than about 130°. The angle may be in a range of about 145° to 160°, such as about 150°.

The invention is further directed to a method of making a restrictor tube to be positioned in an orifice tube as described above. The method may include forming a tubular body to be positioned within the orifice tube and having a pressure-applying end surface portion for urging juice through the strainer tube. The pressure-applying end surface may be formed to have at least a third surface portion with an angle greater than about 130°, more preferably in a range of about 145° to 160°, such as about 150°.

In multiple tests conducted through a fruit processing season, the invention resulted in an overall yield gain of approximately 0.8%. Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the dependent claims.

That which is claimed is:

1. A juice extractor comprising:
   first and second opposing cups relatively movable to compress a fruit therebetween;
   a strainer tube associated with said first cup; and
   an orifice tube having an internal bore and being movable within said strainer tube and said orifice tube having a ring-shaped pressure-applying end surface for urging juice through said strainer tube;
   said pressure-applying end surface having at least a first sloped surface portion extending over greater than about 50% of a total wall thickness of said orifice tube and the first sloped surface portion defining a first imaginary cone having a first included angle in a range of about 145° to 160°.

2. The juice extractor according to claim 1 wherein the first included angle is about 150°.

3. The juice extractor according to claim 1 wherein the first sloped surface portion extends over a total extent of said pressure-applying end surface.

4. The juice extractor according to claim 1 wherein the first sloped surface portion is radially innermost and adjacent the internal bore of said orifice tube; and wherein the pressure-applying end surface further has a second surface portion surrounding the first sloped surface portion and defining a second imaginary cone having a second included angle less than the first included angle.

5. The juice extractor according to claim 1 wherein said orifice tube further has a radially outermost flat ring-support surface surrounding the pressure-applying end surface.

6. The juice extractor according to claim 1 further comprising a restrictor tube having a pressure-applying end surface and being positioned within the internal bore of said orifice tube; and wherein the pressure-applying end surface of said restrictor tube has at least a third surface portion defining a third imaginary cone having a third included angle greater than about 130°.

7. The juice extractor according to claim 6 wherein the, third included angle is in a range of about 145° to 160°.

8. The juice extractor according to claim 6 wherein the third surface portion extends over greater than about 50% of a total wall thickness of said restrictor tube.

9. The juice extractor according to claim 6 wherein the third surface portion extends over a total wall thickness of said restrictor tube.

10. The juice extractor according to claim 6 wherein the third surface portion is radially outermost and adjacent the internal bore of said orifice tube; and wherein the pressure-applying end surface of said restrictor tube further has a fourth surface portion surrounded by the third surface portion and defining a fourth imaginary cone having a fourth included angle less than the third included angle.

11. The juice extractor according to claim 1 further comprising a drive mechanism for reciprocating said orifice tube within said strainer tube.

12. A juice extractor comprising:
  first and second opposing cups relatively movable to compress a fruit therebetween;
  a strainer tube associated with said first cup; and
  an orifice tube being movable within said strainer tube and said orifice tube having a radially outermost flat ring-support surface, a ring-shaped pressure-applying end surface within said flat ring-support surface for urging juice through said strainer tube, and an empty internal bore;
  said pressure-applying end surface having at least a first sloped surface portion extending over greater than about 50% of a total wall thickness of said orifice tube and the first sloped surface portion defining a first imaginary cone having a first included angle in a range of about 145° to 160°.

13. The juice extractor according to claim 12 wherein the first included angle is about 150°.

14. The juice extractor according to claim 12 wherein the first sloped surface portion extends over a total extent of said pressure-applying end surface.

15. The juice extractor according to claim 12 wherein the first sloped surface portion is radially innermost and adjacent the internal bore of said orifice tube; and wherein the pressure-applying end surface further has a second surface portion surrounding the first sloped surface portion and defining a second imaginary cone having a second included angle less than the first included angle.

16. An orifice tube for a juice extractor comprising first and second opposing cups relatively movable to compress a fruit therebetween, and a strainer tube associated with the first cup, the orifice tube comprising:
  a tubular body having an internal bore and being movable within the strainer tube and said tubular body having a ring-shaped pressure-applying end surface for urging juice through the strainer tube;
  said pressure-applying end surface having at least a first sloped surface portion extending over greater than about 50% of a total wall thickness of said orifice tube and the first sloped surface portion defining a first imaginary cone having a first included angle in a range of about 145° to 160°.

17. The orifice tube according to claim 16 wherein the first included angle is about 150°.

18. The orifice tube according to claim 16 wherein the first sloped surface portion extends over a total extent of said pressure-applying end surface of said tubular body.

19. The orifice tube according to claim 16 wherein the first sloped surface portion is radially innermost and adjacent the internal bore of said tubular body; and wherein the pressure-applying end surface of said tubular body further has a second surface portion surrounding the first sloped surface portion and defining a second imaginary cone having a second included angle less than the first included angle.

20. The orifice tube according to claim 19 wherein said tubular body further has a radially outermost flat ring-support surface surrounding the pressure-applying end surface.

21. A method for making an orifice tube for a juice extractor comprising first and second opposing cups relatively movable to compress a fruit therebetween, and a strainer tube associated with the first cup, the method comprising:
  forming a tubular body having an internal bore and to be movable within the strainer tube and the tubular body having a ring-shaped pressure-applying end surface for urging juice through the strainer tube; and
  forming the pressure-applying end surface to have at least a first sloped surface portion extending over greater than about 50% of a total wall thickness of said tubular body and the first sloped surface portion defining a first imaginary cone having a first included angle in a range of about 145° to 160°.

22. The method according to claim 21 wherein the first included angle is about 150°.

23. The method according to claim 21 wherein the first sloped surface portion extends over a total extent of said pressure-applying end surface of said tubular body.

24. The method according to claim 21 wherein the first sloped surface portion is radially innermost and adjacent the internal bore of the tubular body; and further comprising forming the pressure-applying end surface of the tubular body further to have a second surface portion surrounding the first sloped surface portion and defining a second imaginary cone having a second included angle less than the first included angle.

25. The method according to claim 24 further comprising forming a radially outermost flat ring-support surface surrounding the pressure-applying end surface.

\* \* \* \* \*

UNITED STATES PATENT AND TRADEMARK OFFICE
CERTIFICATE OF CORRECTION

PATENT NO. : 7,487,721 B2  Page 1 of 1
APPLICATION NO. : 10/635226
DATED : February 10, 2009
INVENTOR(S) : Amador et al.

It is certified that error appears in the above-identified patent and that said Letters Patent is hereby corrected as shown below:

Column 3, Line 3         Delete: "that"
                         Insert: --than--

Column 6, Line 11        Delete: "include and"
                         Insert: --include--

Column 8, Line 5         Delete: "orifice tube"
                         Insert: --tubular body--

Signed and Sealed this

Ninth Day of June, 2009

JOHN DOLL
*Acting Director of the United States Patent and Trademark Office*